May 27, 1947.  J. E. MAHAN  2,421,030
PROCESS FOR SYNTHESIS OF AMIDES
Filed Sept. 10, 1945
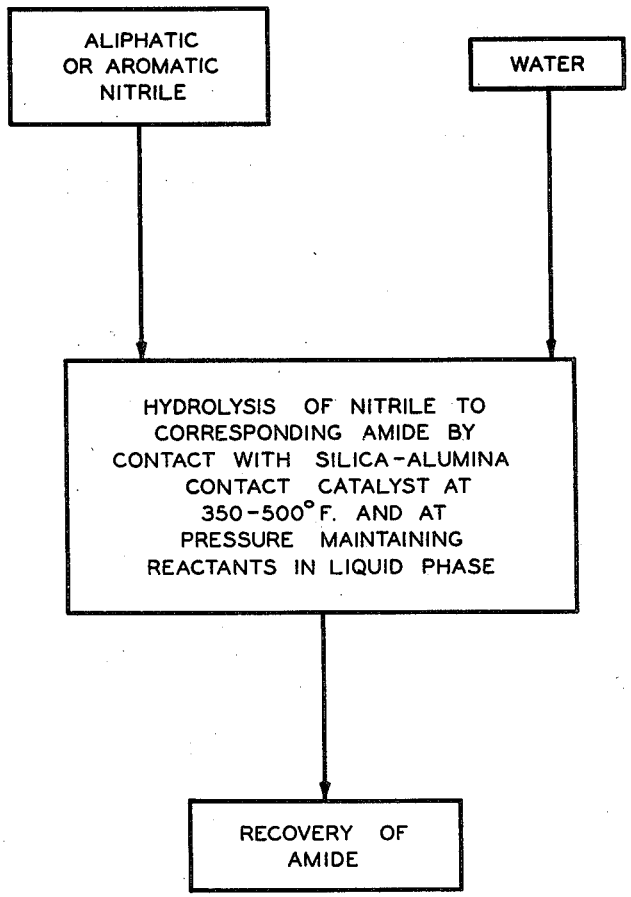
INVENTOR.
J.E. MAHAN
BY Hudson & Young
ATTORNEYS Patented May 27, 1947

2,421,030

UNITED STATES PATENT OFFICE 2,421,030

PROCESS FOR SYNTHESIS OF AMIDES

John E. Mahan, Bartlesville, Okla., assignor to Phillips Petroleum Company, a corporation of Delaware Application September 10, 1945, Serial No. 615,346

14 Claims. (Cl. 260—561)

This invention relates to a novel process for the synthesis of amides and especially to such a process wherein simple aliphatic or aromatic nitriles are used as a starting material.

The objects of the present invention are: to provide a new and improved process for the production of amides; to provide a process for the synthesis of amides from the corresponding nitriles and water; to effect the interaction of nitriles with water over selective contact catalysts in such a manner that the corresponding amide is the principal reaction product; to provide a process for the hydrolysis of nitrile in such manner that the hydrolysis stops at the amide and yields practically none of the corresponding carboxylic acid; to provide a process of the foregoing type which is especially adapted to the use of simple, i. e., unsubstituted, aliphatic saturated nitriles and aromatic nitriles. Many other objects will hereinafter appear to those skilled in the art.

The accompanying drawing portrays diagrammatically the preferred mode of practicing the present invention.

Acid amides are potentially very valuable and would have important uses both as such and as intermediates in further chemical syntheses but their application has been retarded by their relatively limited commercial supply and high cost. Of the simple aliphatic amides, only acetamide has been available on any sizeable commercial scale, and the widespread interest which has been aroused in it and the many valuable applications which have been found for it are evidence of the potential importance of this group of compounds.

Thus, for example, acetamide was formerly used principally as a chemical intermediate in synthesis of acetonitrile and methyl amine and had found few uses itself, even though its remarkable solvent powers were well known. Greater commercial availability stimulated investigation, however, and acetamide has now been found to be very useful and desirable as a plasticizer and solvent in a wide variety of industries. Thus, it has been found to be an excellent solvent for cellulose esters, and also for various natural and synthetic gums and resins. It has therefore been found very useful as a solvent and a plasticizer for these resins in adhesives, in paints, in varnishes, and in the manufacture of plastics. It is valuable as a plasticizer-solvent in much the same way in the manufacture of paper, of photographic film, in the conditioning of leather, and in vulcanizing and processing of rubber. In the textile industry it has been found very useful as a solvent for dyes and as a solvent and plasticizer for sizing materials. It is an excellent solvent for a wide variety of organic materials including aromatics, cycloparaffin derivates, aldehydes and ketones, phenols, amino acids and many others, and obviously could find wide usage in industry where any of these materials are employed. Moreover, it is also a good solvent, better than water, for many inorganic compounds such as lead, and mercury salts and many others. Due to its miscibility with inorganic compounds as well as organic it has been found useful in antifreeze mixtures and in explosives of the ammonium nitrate type.

Nevertheless the application of acetamide to these commercial uses and the exploitation of even wider uses is still restricted by its limited supply and high cost. Moreover, in many instances it would be desirable to use an amide of different physical properties such as would be imparted by three, four, or even more carbon atoms in the compound or even by the presence of aromatic nuclei. Amides of this type have been largely unavailable, difficult of synthesis and costly and have received little attention because of their unavailability.

Heretofore, the synthesis of amides has been accomplished via the corresponding carboxylic acids or more often their ammonium salts. Thus, one common method has been the pyrolysis of the ammonium salt of the acid. This generally results in the formation of a number of other decomposition products of both higher and lower molecular weight, reducing the yield of the desired amide and introducing purification difficulties which may become extreme and result in still further product losses. A more satisfactory method has been the treatment of esters of the acids with ammonia. While in many instances this has been a relatively satisfactory synthesis, it has had the disadvantage of being even more indirect in most instances than from the acids themselves. In general the esters are prepared from the acids, and the acids in turn result from other synthetic processes, such as synthesis and hydrolysis of the nitriles. Conversion of the acid to the acid chloride and treatment of this with ammonia has been another of the indirect routes to the amides. None of these methods, however, has proved to be very useful in large scale commercial production of the aliphatic amides, particularly those having from two to about eight or ten carbon atoms per molecule, and the supply from these sources has remained limited and of high cost.

The direct route from the nitriles to the amides by partial hydrolysis offers many attractive possibilities in the synthesis of amides, but heretofore it has not been practicable to carry out this hydrolysis satisfactorily. Complete hydrolysis to the free acid (or its ammonium salt) occurs very readily and smoothly, and in competition with it, the desired partial reaction to the amide generally is suppressed to a very minor fraction of the total conversion.

Nitriles may readily be synthesized directly from the plentiful olefinic and acetylenic hydrocarbons and present one of the most available and potentially cheap sources of amides. Thus, for instance, it has long been known that acetonitrile can be made by addition of ammonia to acetylene and I have recently shown in application Ser. No. 589,457, filed April 20, 1945, that it may readily be made by catalytic interaction of ammonia with olefins of three to five carbon atoms. I have also shown that saturated nitriles result from the action of ammonia on olefin oxides (application Ser. No. 567,779, filed December 11, 1944) and another and myself have shown the preparation of unsaturated nitriles from HCN and diolefins (application Ser. No. 563,744, filed November 16, 1944) or acetylene (application Ser. No. 559,840, filed October 21, 1944). All these gases are available in great quantities from petroleum refining operations (or derivable therefrom in the case of the olefin oxides) and these new processes serve to make the nitriles one of the most desirable sources of amides.

Hydrolysis of nitriles may be represented by the following equations:

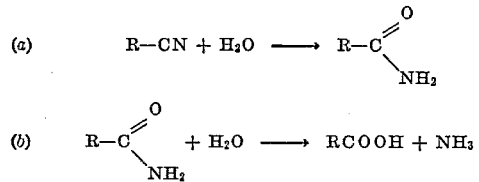

where R represents an alkyl or aryl group.

The first step (a) yields the desired acid amides and has been found to be the rate-controlling reaction. The second step (b) has been found to proceed extremely rapidly. For this reason it has heretofore not been practicable to carry out the synthesis of amides by this very desirable route, the acid being almost the sole product obtainable. This has particularly been true in the case of the simple aliphatic amides, and it is frequently stated in the literature that it is impossible to produce these amides by this route.

In the few instances in which hydrolysis of certain nitriles to amides has been accomplished it has been through the steps of dissolving the nitrile in concentrated sulfuric acid and pouring into water, or by the use of an alkaline hydrogen peroxide solution. Charring and decomposition of the product accompany the first method, resulting in low yields and contaminated products; in the latter, considerable loss to acids occurs, the peroxide reagent is consumed, constituting an expense, and contamination of the product with traces of peroxide renders it potentially dangerous.

I have now found that by passing a mixture of the required nitrile with water over a suitable contact type catalyst at elevated temperatures, I am able to effect its hydrolysis smoothly and completely to the corresponding acid amide. The hydrolysis does not continue through the normally very rapid second hydrolytic step, but on the contrary yields practically none of the carboxylic acid. This wholly new and unexpected result is obtained even when hydrolyzing the simple aliphatic nitriles which has been so consistently stated to be impossible.

In a more specific embodiment, my invention comprises passing a mixture of liquid acetonitrile, or other suitable aliphatic or simple aromatic nitrile, with water over a contact type catalyst, in the liquid phase under superatmospheric pressure sufficient to maintain the mixture in the liquid phase at the temperature of from 200 to 700° F. required. Water is used in the smaller molecular proportion and generally the quantity of nitrile will be from two mols to ten mols or more to one of water. Catalysts which I have found suitable for the reaction include a synthetic silica-alumina gel catalyst, activated clays, alumina, silica gel and the like. When operating with acetonitrile I have found a temperature of 475–500° F. and a pressure of 1000 p. s. i. g. to be convenient. Using an excess of acetonitrile in the ratio of about six to seven mols to one of water, a flow rate of 0.5 liquid volume of feed per volume of catalyst space per hour has been found to yield good conversions. The yield of acetamide produced may be made substantially equivalent to the water charged, or if desired, somewhat lower conversions may be carried out. The acetamide, being solid, is easily separated from the unreacted acetonitrile by a simple low temperature distillation and is recovered and purified by crystallization or distillation or other suitable means. The acetonitrile is recycled to the unit together with more water and additional fresh feed and continuous operation is obtained. When I operate with other homologous aliphatic nitriles or aromatic nitriles, minor adjustments are made in operating conditions and recovery procedure to yield the best results.

It is an advantage of my process that it can be operated as a direct and continuous process, with the many great advantages in operation and plant capacity of such processes over the batch type. It is a further advantage that no contaminants are added to the reaction stream as catalysts, such as for instance acids or bases. In the heterogeneous contact catalytic process which I operate, using stationary catalyst beds of substantially neutral material, no harmful effects on the reactants or products result. Contact with peroxides is also avoided. Purification difficulties are reduced to a minimum, the amides resulting being made available in very high purity, and the unconverted nitrile being suitable for recycling without extended purification.

In carrying out my process I prefer to use a synthetic silica-alumina catalyst. When using this catalyst I find that superior yields of amides may be obtained, and recovery of unhydrolyzed nitrile is likewise excellent because of the very limited extent of decomposition reactions. Other catalysts of somewhat similar nature are also contemplated within the scope of my invention. In the group which I have found to be active are certain of the natural clay minerals, such as fuller's earth activated by heating, acid treated montmorillonite, and the like. Silica gel, on the one hand, and Activated Alumina granules on the other are also active. Other contact catalytic materials have not been found usable, and the group which I have found satisfactory includes only the two above mentioned active oxides and the natural and synthetic active combinations thereof. All of these materials are rugged and have long active life periods, and withstand continued handling and heating.

The synthetic silica-alumina catalysts which I prefer to use are most accurately described as dried gels and are characterized by their chemical composition, their physical properties and specific methods of preparation which account for their catalytic activity. Although these catalysts are broadly referred to as silica-alumina compositions, it is important to further define the origin, physical structure and chemical composition in order to differentiate the catalysts most active in the present process from the naturally occurring minerals which contain the same components but which have less activity in my process.

The natural and synthetic aluminum silicates were originally studied with respect to their polymerizing qualities and it was noted that catalysts of superior activity resulted from synthetic preparations involving precipitation of the oxides in gel form and not necessarily in the proportions found in nature. The gel structure was usually essential. Suitable silica-alumina catalysts have been prepared by the methods described by McKinney in U. S. Patents 2,142,324 and 2,147,985, and employed in polymerization of gaseous olefins. Subsequently they have been found extremely useful in alkylation of benzene with olefins, in dealkylation, and other processes.

In general, these catalysts are prepared by first forming a hydrous silica gel from an alkaline silicate and an acid, washing soluble material from the gel, treating or activating the gel with an aqueous solution of a suitable aluminum salt and subsequently washing and drying the treated material. In this manner, part of the alumina, probably in the form of a hydrous oxide, is selectively adsorbed by the hydrous silica and is not removed by subsequent washing. Modifications may be made in the foregoing procedure and catalysts of suitable activity may result. Whether prepared by exactly this method, or some other, the catalyst will contain a major portion of silica and a minor portion of alumina. This minor proportion of alumina will not generally be in excess of about 10 per cent by weight and will more often be between about 0.1 and 2 per cent by weight.

The operating temperatures in my process may broadly be within the limits of about 200 to 700° F. although I generally prefer to operate at from 350 to 550° F., especially when using my preferred silica-alumina catalysts. In the lower ranges, conversion is reduced and at temperatures in excess of 700°, or below in some cases, decomposition reactions of nitrile or amide become too great to be tolerated. When preparing acetamide from acetonitrile I have found the range 480-500° F. to be very satisfactory.

While superatmospheric pressures are essential in the process I have found that as long as the pressure is high enough to maintain the feed in the liquid phase at the temperature of operation the operating range is not critical. Many obvious advantages in high pressure operation exist, such as increased throughput and suppression of splitting reactions, but the cost of equipment mounts rapidly as pressure increases. I have found a pressure of 1000 pounds per square inch gage a convenient pressure when making acetamide by my process.

The flow rates used may be between about 0.2 to 2.0 liquid volumes per volume of catalyst per hour. Rates near 0.5 v./v./hr. are often most convenient, resulting in substantially complete hydrolysis without extensive decomposition. The flow rates calculated on the basis of the void space in the catalyst chamber are, of course, considerably higher. When using the preferred silica-alumina catalyst, a flow rate of 0.5 liquid volume per volume of catalyst space per hour is equivalent to approximately 1.25 volumes per volume void space.

The ratio of nitrile to water I have found to be preferably above 2 to 1. It may be used as high as desired but generally little benefit is gained in going beyond about four or five to one, and reduced production per pass results from reducing water content further than needed. In the case of higher aliphatic nitriles, i. e., nitriles having more than three carbon atoms per molecule, the solubility of water in the nitrile may limit the amount used, however. In these cases, or in others if desired, I may operate with the use of a third component, in which both the nitrile and water are miscible. Such a third component should be substantially inert in the reaction. Alcohols may be used in some instances where imino ether formation can be avoided. Pyridines, especially the picolines, are often very useful in this respect, and dioxane may also be employed.

In some instances, however, it may prove more satisfactory to operate without the use of a third component, and to employ a mixed phase process in which the water is dispersed as a second liquid phase.

Carbonaceous deposits gradually build up on the catalyst in normal operation and from time to time the activity of the catalyst will require revivification. This may be done in a manner well known in catalytic processes by passing a controlled stream of oxygen-containing gas and removing the deposits by combustion. The process may be made cyclic, with regular intervals of processing and regeneration of some hours duration, or as conditions are milder, operation may continue many hours or days with only occasional short periods of regeneration.

While in this specification I have described in detail the hydrolysis of simple, i. e., unsubstituted, saturated aliphatic nitriles and especially of acetonitrile, it is to be understood my process is equally applicable to simple aromatic nitriles, unsaturated aliphatic nitriles and certain substituted nitriles whose substituents are resistant to hydrolysis. In general the nitriles employed in accordance with the present invention have the formula R—CN where R is an alkyl, alkenyl, aryl or aralkyl group.

The following examples are illustrative of how my process is carried out in practice.

*Example 1*

A steel tube, 1 inch in inside diameter, was charged with 105 ml. of 8-14 mesh synthetic silica-alumina gel catalyst containing 1.0 per cent alumina and prepared by activation of the hydrous silica gel with an aluminum salt in the manner described above. It was maintained at a temperature of 475-490° F. while a mixture of 87 mol per cent acetonitrile and 13 mol per cent water was passed through it at a flow rate of 0.50 liquid volume per volume of catalyst space per hour (52 ml./hr.) at a pressure of 1000 lbs. gage. Samples of the effluents were taken at intervals. A yield of acetamide equivalent to 93 per cent of the water charged was recovered. The unreacted portion of the nitrile was recovered in 96 per cent yields and continuously recycled to the process. After 24 hours operation the catalyst showed only a slight discoloration from carbonaceous deposits. A duplicate experiment in which the tube was packed with similar size glass chips resulted in only 12 per cent yield of amide.

*Example 2*

The apparatus of Example 1 was charged with a sample of the synthetic silica-alumina gel catalyst, identical with that used in Example 1, and a feed mixture of 87 mol per cent acetonitrile and 13 per cent water passed over it under a pressure of 1000 p. s. i. g. at a flow rate of 0.5 liquid volume per volume of catalyst space per hour. The temperature was maintained at 385–400° F. A yield of 32 per cent of acetamide based on the water charged was isolated, and substantially all the unreacted nitrile was recovered and recycled. A similar experiment in which the tube was empty of catalyst and flow rate was adjusted to give the same contact time gave a yield of only 5 per cent acetamide.

*Example 3*

The apparatus of Example 1 was charged with samples of catalysts of silica gel, alumina, and activated clay, respectively, in three succeeding tests, and the feed stock of Example 1 charged to it at the same conditions as in the said example, i. e., 1000 p. s. i. g., a flow rate of 0.5 liquid volume per volume of catalyst space per hour, and temperature of 470–490° F. The yields of acetamide obtained in each case are tabulated below.

| Catalyst | Yield of Amide |
|---|---|
| | Per cent |
| Silica-Gel | 75 |
| Activated Alumina | 56 |
| Activated Clay | 82 |

All these catalysts were 8–14 mesh. Recovery of unreacted nitrile was 90 per cent or better in all cases. The activated clay catalyst was an acid treated montmorillonite.

*Example 4*

The apparatus of Example 1 was charged with 105 ml. of silica-alumina catalyst and a feed comprising one mol of water and nine mols of propionitrile was charged to it liquid phase at 1000 p. s. i. g. The flow rate used was 0.5 liquid volumes per volume of catalyst space per hour and temperature was maintained at 460–490° F. A yield of 70 per cent of propionamide, based on the water was obtained, and the unreacted nitrile was recovered in 95 per cent yield. The propionamide had after recrystallization a melting point of 81.0° C.

I claim:
1. The process of synthesizing an amide from the corresponding nitrile which comprises contacting a mixture of said nitrile and water with a solid contact catalyst selected from the group consisting of active silica, active alumina, and natural and synthetic active combinations of silica and alumina, at an elevated temperature and at a pressure such as to maintain the reactants in liquid phase.

2. The process of synthesizing an amide from the corresponding nitrile which comprises contacting a mixture wherein the reactants consist of said nitrile and water with a solid contact catalyst selected from the group consisting of active silica, active alumina, and natural and synthetic active combinations of silica and alumina at a temperature of from 200 to 700° F. and at a superatmospheric pressure sufficient to maintain the reactants in liquid phase.

3. The process of claim 2 wherein said nitrile is present in said mixture in molecular excess over said water.

4. The process of claim 2 wherein said nitrile is present in said mixture in an amount such as to give a molar ratio of nitrile to water of at least 2 to 1.

5. The process of claim 2 wherein said nitrile is present in said mixture in an amount such as to give a molar ratio of nitrile to water of from 2 to 1 up to 10 to 1.

6. The process of claim 2 wherein said nitrile is acetonitrile and said amide is acetamide.

7. The process of claim 2 wherein said catalyst is silica gel activated with from 0.1 to 10 weight per cent of alumina.

8. The process of claim 2 wherein said nitrile is sparingly soluble in water and wherein an inert third component with which both said nitrile and water are miscible is employed in such proportions as to give a homogeneous solution.

9. The process of synthesizing an amide from the corresponding nitrile which comprises contacting a mixture of said nitrile and water with a synthetic silica-alumina gel type catalyst at a temperature of from 350 to 550° F. and at a pressure such as to maintain the reactants in liquid phase, and recovering said amide from the resulting reaction mixture.

10. The process of synthesizing an unsubstituted saturated aliphatic amide which consists of contacting a mixture consisting of an unsubstituted saturated aliphatic nitrile and water with a synthetic silica-alumina gel type catalyst at a temperature of from 350 to 500° F. and at a pressure such as to maintain the reactants in liquid phase, and recovering said amide from the resulting reaction mixture.

11. The process of synthesizing acetamide from acetonitrile which comprises contacting a mixture consisting of acetonitrile and water in which the molar ratio of acetonitrile to water is at least 2 to 1 with a synthetic silica-alumina gel type catalyst at a temperature of from 475 to 500° F. and a pressure of approximately 1000 pounds per square inch gage.

12. The process of synthesizing acetamide from acetonitrile which comprises contacting a mixture consisting of approximately 87 mol per cent of acetonitrile and 13 mol per cent of water with a synthetic silica-alumina gel type catalyst, prepared by activating silica gel with from 0.1 to 2 per cent by weight of alumina, at a temperature of 475 to 490° F. and a pressure of approximately 1000 pounds per square inch gage and at a flow rate of 0.50 liqiud volumes of said mixture per volume of catalyst space per hour.

13. The process of synthesizing an amide from the corresponding nitrile which comprises contacting a mixture consisting of said nitrile and water, said nitrile being such and the proportions of said nitrile and water being such that they are immiscible under the reaction conditions, with a solid contact catalyst selected from the group consisting of active silica, active alumina, and natural and synthetic active combinations of silica and alumina at a temperature of from 200 to 700° F. and at a superatmospheric pressure sufficient to maintain the reactants in liquid phase.

14. The process of synthesizing an unsubstituted saturated aliphatic amide which comprises passing a liquid mixture in which the reactants consist of an unsubstituted saturated aliphatic nitrile and water in proportions such that the molar ratio of nitrile to water is above 2:1 through a stationary bed of contact type catalyst consisting of a synthetic silica-alumina gel type catalyst prepared by forming a hydrous silica gel from an alkaline silicate and an acid, washing soluble material from the gel, activating the washed gel while in the hydrous state with an aqueous solution of an aluminum salt and subsequently washing and drying the treated material to yield a catalyst containing from 0.1 to 10 per cent by weight of alumina, carrying out said contacting step at a temperature of from 350 to 550° F., at a pressure such as to maintain the reactants in liquid phase and at a flow rate of from 0.2 to 2.0 liquid volumes per volume of catalyst per hour, and recovering said amide from the resulting reaction mixture.

JOHN E. MAHAN.

REFERENCES CITED

The following references are of record in the file of this patent:

UNITED STATES PATENTS

| Number | Name | Date |
|---|---|---|
| 2,101,822 | Crawford et al. | Dec. 7, 1937 |
| 2,229,897 | Midrichian | Jan. 28, 1941 |
| 2,331,711 | Midrichian | Oct. 12, 1943 |
| 2,357,484 | Martin | Sept. 5, 1944 |

FOREIGN PATENTS

| Number | Country | Date |
|---|---|---|
| 271,969 | Great Britain | June 9, 1927 |
| 551,869 | Germany | June 7, 1932 |